(12) United States Patent
Kim et al.

(10) Patent No.: US 9,389,803 B2
(45) Date of Patent: Jul. 12, 2016

(54) METHOD FOR CONTROLLING INTERFACE OPERATION AND INTERFACE DEVICE APPLYING THE SAME

(75) Inventors: Jinwoo Kim, Seoul (KR); Young Dug Jung, Yeongin-si (KR); Woo Sik Kim, Hwaseong-si (KR)

(73) Assignee: Seagate Technology LLC, Cupertino, CA (US)

( * ) Notice: Subject to any disclaimer, the term of this patent is extended or adjusted under 35 U.S.C. 154(b) by 880 days.

(21) Appl. No.: 13/537,750

(22) Filed: Jun. 29, 2012

(65) Prior Publication Data

US 2013/0166783 A1    Jun. 27, 2013

(30) Foreign Application Priority Data

Jul. 1, 2011   (KR) .................. 10-2011-0065483

(51) Int. Cl.
*G06F 3/00*     (2006.01)
*G06F 13/16*    (2006.01)
*G06F 3/06*     (2006.01)

(52) U.S. Cl.
CPC ............ *G06F 3/0659* (2013.01); *G06F 3/0614* (2013.01); *G06F 3/0634* (2013.01); *G06F 3/0676* (2013.01)

(58) Field of Classification Search
CPC ................ G06F 2212/7201; G06F 2212/7205; G06F 2212/2022; G06F 12/0246; G06F 12/0811; G06F 12/0813
USPC ............................................................ 710/6
See application file for complete search history.

(56) References Cited

U.S. PATENT DOCUMENTS

| | | | |
|---|---|---|---|
| 7,167,959 B2 * | 1/2007 | Lin ............................... | 711/158 |
| 7,451,333 B2 * | 11/2008 | Naveh et al. .................. | 713/323 |
| 7,694,026 B2 * | 4/2010 | Huffman .......................... | 710/5 |
| 2010/0067133 A1 * | 3/2010 | Ooi ................................ | 360/31 |

\* cited by examiner

*Primary Examiner* — Titus Wong
(74) *Attorney, Agent, or Firm* — Mueting, Raasch & Gebhardt, P.A.

(57) ABSTRACT

Methods for controlling an interface operation, the method including stopping an operation being processed in a storage device and switching the state of the storage device to a first state, when a condition for switching the state of the storage device to an idle state occurs in a command processing process according to a communication protocol; performing an operation of deleting information from a previous command stored in hardware of the storage device when the state of the storage device is switched to the first state; and switching the state of the storage device to the idle state after the operation of deleting the information on the previous command is completed, wherein in the first state, the storage device cannot be switched to the first state before the information from the previous command is deleted.

20 Claims, 16 Drawing Sheets

| L2: L_SyncEscape | Transmit SYNCp | | |
|---|---|---|---|
| 1. AnyDword other than X_RDYp or SYNCp received from Phy. | | → | L_SyncEscape |
| 2. X_RDYp or SYNCp received from Phy. | | → | L_IDLE |
| 3. PHYRDYn | | → | L_NoCommErr |

FIG. 17

| L2: L_SyncEscape | Transmit SYNCp | | |
|---|---|---|---|
| 1. AnyDword other than X_RDYp or SYNCp received from Phy. | | → | L_SyncEscape |
| 2. X_RDYp or SYNCp received from Phy, and firmware error recovery not completed. | | → | L_SyncEscape |
| 2. X_RDYp or SYNCp received from Phy, and firmware error recovery completed. | | → | L_IDLE |
| 3. PHYRDYn | | → | L_NoCommErr |

FIG. 18

025B2
METHOD FOR CONTROLLING INTERFACE OPERATION AND INTERFACE DEVICE APPLYING THE SAME

PRIORITY

This application claims priority to Korean Patent Application Number 10-2011-0065483 entitled, "METHOD FOR CONTROLLING INTERFACE OPERATION AND INTERFACE DEVICE APPLYING THE SAME," filed on Jul. 1, 2011, which is hereby incorporated by reference in its entirety.

BACKGROUND

Storage media are written to or read from via commands generated from host devices. Methods for controlling such operations are constantly being updated and changed in efforts to decrease malfunctions from occurring when exceptional situations occur.

SUMMARY OF THE INVENTION

Disclosed herein are methods for controlling an interface operation, the method including stopping an operation being processed in a storage device and switching the state of the storage device to a first state, when a condition for switching the state of the storage device to an idle state occurs in a command processing process according to a communication protocol; performing an operation of deleting information from a previous command stored in hardware of the storage device when the state of the storage device is switched to the first state; and switching the state of the storage device to the idle state after the operation of deleting the information on the previous command is completed, wherein in the first state, the storage device cannot be switched to the first state before the information from the previous command is deleted.

Also disclosed are interface devices that include a transmission unit configured to transmit a signal through a transmission signal line; a reception unit configured to receive a signal through a reception signal line; a storage means configured to store information regarding a command received through the reception unit; and an interface control unit configured to transmit or receive a signal through the transmission unit or the reception unit according to a serial communication protocol, and process the command based on the information stored in the storage means, wherein when a condition for switching the state of a storage device to an idle state occurs in the command processing process, the interface control unit does not allow the state of the storage device to be switched to the idle state until a process of deleting information on a previous command stored in the storage means is completed.

These and various other features will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 17 is a table specifying embodiments of operations in a SYNC Escape state.

FIG. 18 is a table specifying embodiments of operations in a SYNC Escape state.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF THE INVENTION

Figure 1:
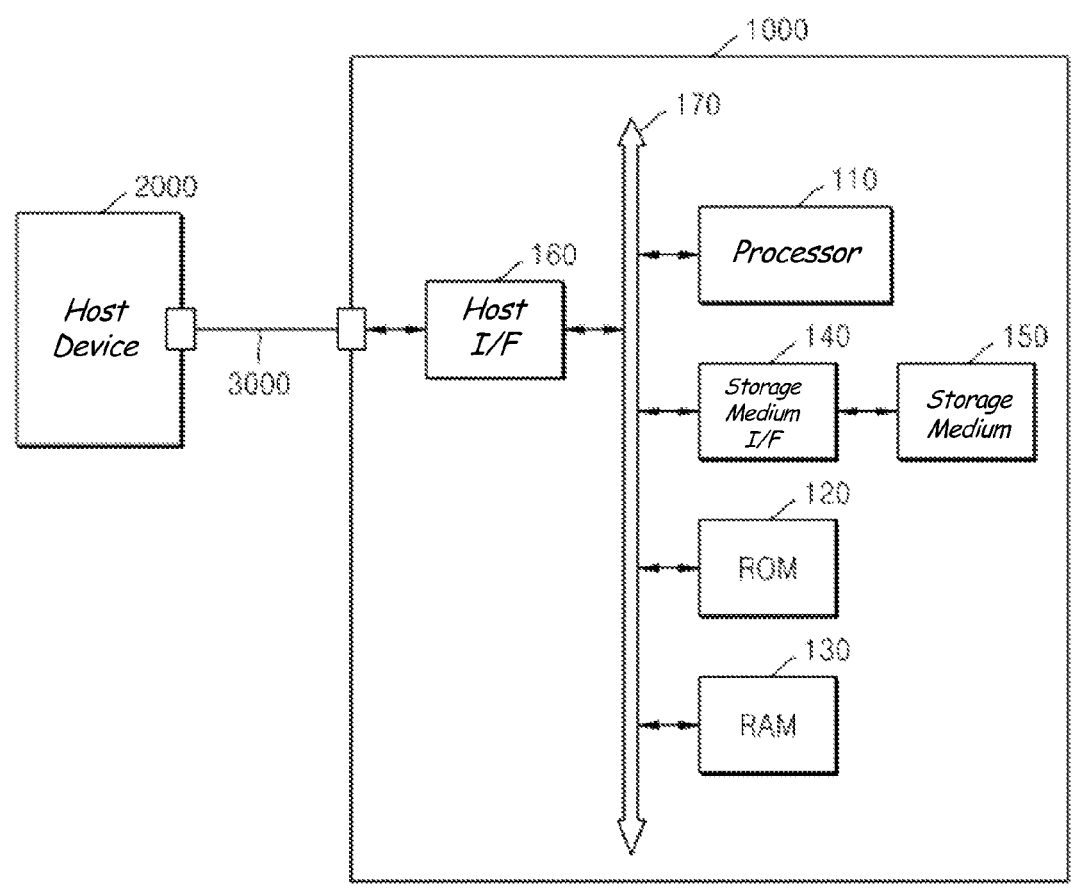
FIG. 1 is a diagram of a computer system.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed herein are methods for controlling interface operations so that a malfunction is less likely to occur or does not occur when an exceptional situation occurs during communication between a storage device and a host device. Interface devices for controlling interface operations so that a malfunction is less likely to occur or does not occur when an exceptional situation occurs during communication between a storage device and a host device are also disclosed. When disclosed embodiments of methods and devices are utilized, it can be possible to prevent the occurrence of a malfunction when exceptional situation occurs while the storage device and the host device are connected to perform communication with each other. More specifically, in some embodiments is can be possible to prevent a malfunction caused by a difference in response speed between the hardware and firmware when an exceptional situation such as a SYNC Escape occurs in the command processing process according to the communication protocol. That is, it can be possible to prevent a phenomenon that the state of the storage device is switched to an IDLE state before a recovery process performed by the firmware is completed in a SYNC Escape state, and therefore, a new command cannot be normally processed.

As shown in FIG. 1, an embodiment of a computer system can include a storage device 1000, a host device 2000 and a connector 3000. Specifically, the storage device 1000 can include a processor 110, a read only memory (ROM) 120, a random access memory (RAM) 130, a storage medium interface (I/F) 150, a host I/F 160 and a bus 170. The host device 2000 can generate a command for operating the storage device 1000 and transmit the generated command to the storage device 1000 connected thereto through the connector 3000. The host device 2000 can perform a process of transmitting or receiving data to or from the storage device 1000. The connector can be configured to electrically connect an interface port of the host device 2000 and an interface port of the storage device 1000, and may include a data connector and a power connector for example. In a specific embodiment where a serial advance technology attachment (SATA) interface is used, the connector 3000 may be configured to include a SATA data connector with 7 pins and a SATA power connector with 15 pins for example.

Components of the storage device 1000 will now be described. The processor 110 can analyze a command and control components of the storage device based on the analyzed result. The processor 110 can include a code object management unit, and can load a code object stored in the storage medium 150 to the RAM 130 using the code object management unit. The processor 110 can load, to the RAM 130, code objects for performing methods according to the flowcharts of FIGS. 13 to 16 and 20 for example. The processor 110, may then perform a task for the method according to the flowcharts of FIGS. 13 to 16 and 20, using the code objects loaded to the RAM 130. A method of controlling an interface operation, performed by the processor 110, and a method of controlling an interface operation by downloading a program through a network will be described in detail with reference to FIGS. 13 to 16 and 20.

Program codes and data for operating the data storage device can be stored in the ROM 120. The program codes and data stored in the ROM 120 or the storage medium 150 can be loaded to the RAM 130 under the control of the processor 110. The storage medium 150 can be a main storage medium of the storage device 1000, and may include a disk or non-volatile semiconductor memory device.

Figure 3:
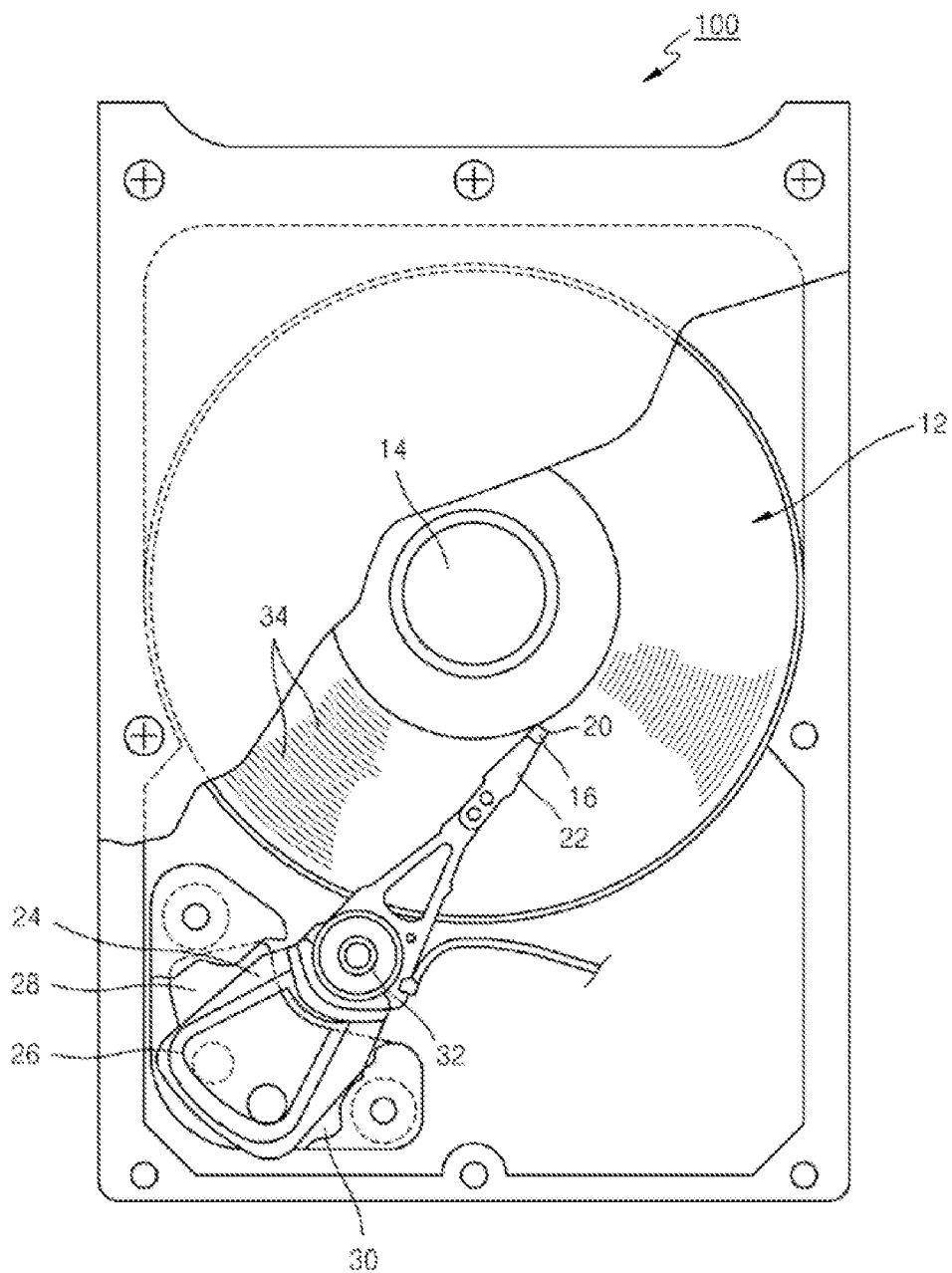
FIG. 3 is a plan view of an embodiment a head disk assembly of a disk drive.

The storage device may include, for example, a disk drive, and a head disk assembly 100. Referring to FIG. 3, the head disk assembly 100 can include at least one disk 12 rotated by a spindle motor (SPM) 14. The disk drive may also include a head 16 positioned adjacent to a surface of the disk 12. The head 16 may read/record information from/onto the rotating disk 12 by sensing a magnetic field of each disk 12 and magnetizing the disk 12. Generally, the head 16 is coupled to the surface of each disk 12. Although a single head 16 is illustrated in FIG. 3, it should be understood that the head 16 can be composed of a recording head for magnetizing the disk 12 and a reading head for sensing the magnetic field of the disk 12. The reading head may be implemented from a magneto-resistive (MR) device. The head 16 may be referred to as a "magnetic head" or "transducer". The head 16 may be integrated with a slider 20. The slider 20 can be configured to generate air bearing between the head 16 and the surface of the disk 12. The slider 20 can be coupled to a head gimbal assembly 22. The head gimbal assembly 22 can be attached to an actuator arm 24 having a voice coil 26. The voice coil 26 can be positioned close to a magnetic assembly 28 so as to define a voice coil motor (VCM) 30. Current supplied to the voice coil 26 generates torque for rotating the actuator arm 24, with respect to a bearing assembly 32. The rotation of the actuator arm 24 can move the head 16 across the surface of the disk 12.

Information can generally be stored in annular tracks of the disk. Each track 34 includes a plurality of sectors. One track is composed of servo information areas in which servo information is recorded and data sectors in which data is stored. The data sector may be referred to as a sector.

A preamble, a servo synchronization indication signal, gray codes and burst signals can be recorded in the servo information area. The preamble can provide clock synchronization when reading servo information, and provide a constant timing margin by having a gap prior to a servo sector. The preamble may be used to determine the gain of an automatic gain control (AGC) circuit (not shown). The servo synchronization indication signal is composed of a servo address mark (SAM) and a servo index mark (SIM). The servo address mark is a signal indicating the start of the servo area, and the servo index mark is a signal indicating the start of the first servo area in a track. The gray code can provide track information, and the burst signals can be used to control the head 16 so that it follows a central portion of the track 34. For example, the burst signals can be implemented as two or more patterns. Specifically, the burst signals can be implemented as four or two patterns. A position error signal used in the track-following control is generated by combining the burst patterns.

The disk 12 has a maintenance cylinder area that a user cannot access and a user data area that the user can access. The maintenance cylinder area may also be referred to as a system area. Various types of information necessary for controlling the disk drive may be stored there. In some embodiments, for example information for performing disclosed methods for controlling the interface operation may also be stored in the maintenance cylinder area.

The head 16 moves across the surface of the disk 12 so as to read or write information from/onto another track. A plurality of code objects for implementing various functions of the disk drive may be stored in the disk 12. For example, a code object for performing an MP3 player function, a code object for performing a navigation function, a code object for performing various video games, etc. may optionally be stored in the disk 12.

Referring back to FIG. 1, the storage medium I/F 140 is a component that allows the processor 110 to write data or read information by accessing the storage medium 150. Specifically, in the storage device implemented as the disk drive, the storage medium I/F 140 can include a servo circuit that controls the disk assembly 100 and a read/write channel circuit that performs signal processing for data read/write. The host I/F 160 can be configured to perform transmission/reception processing with the host device 2000 such as a personal computer or mobile device. For example, the host I/F 160 may use various types of interfaces such as a serial advance technology attachment (SATA) interface, a parallel advance technology attachment (PATA), or a universal serial bus (USB) interface. The bus 170 functions to transmit information between the components of the storage device.

Figure 2:
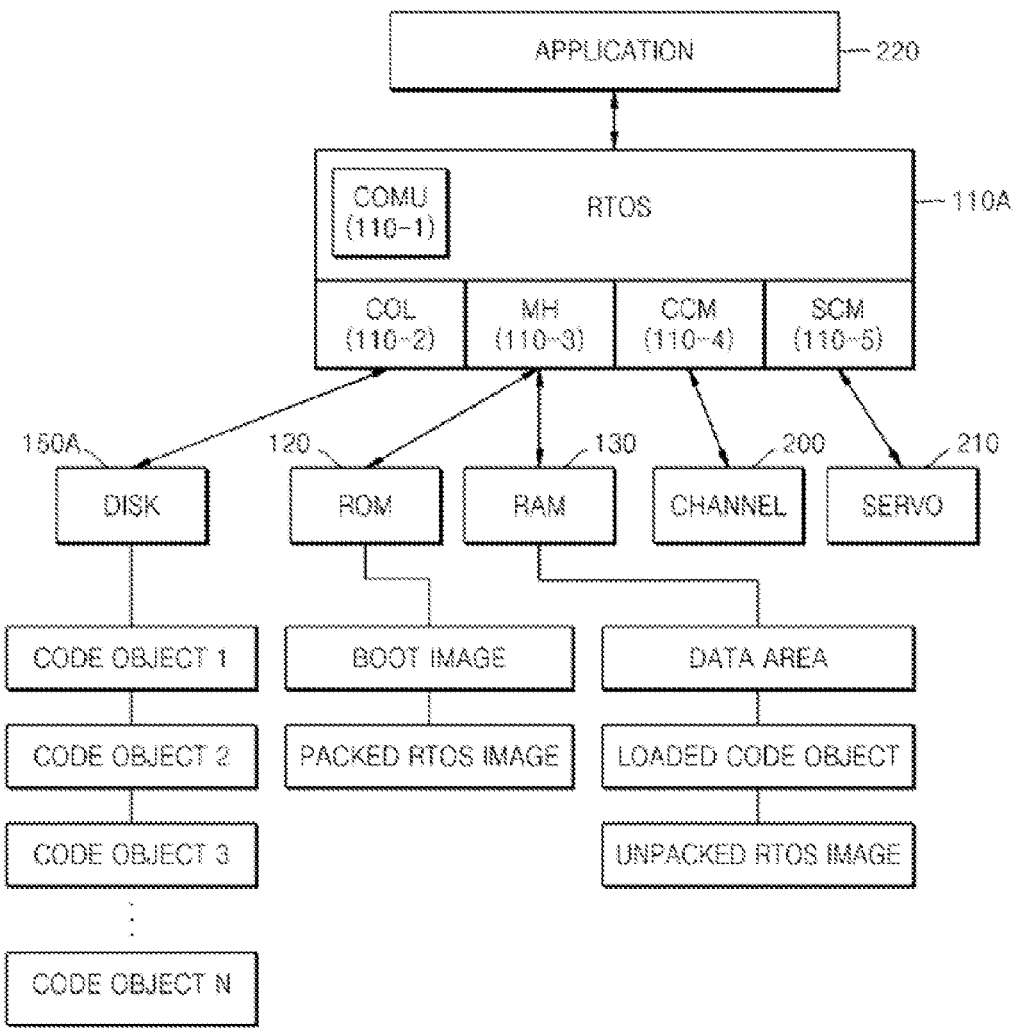
FIG. 2 is a block diagram illustrating an embodiment of a software operating system of a storage device.

Also disclosed herein is a software operating system of a hard disk drive (HDD) that is an example of a storage device will be described with reference to FIG. 2. As shown in FIG. 2, a plurality of code objects 1 to N are stored in a disk 150A that is a storage medium of the HDD. Boot images and packed real time operating system (RTOS) images can be stored in the ROM 120. The plurality of code objects 1 to N are stored in the disk 150A. The code objects 1 to N stored in the disk 150A may include not only code objects necessary for operations of the disk drive but also code objects related to various functions extensible to the disk drive. Particularly, code objects for performing methods according to the flowcharts of FIGS. 13 to 16 and 20 can be stored in the disk 150A. It will be apparent that the code objects for performing the methods according to the flowcharts of FIGS. 13 to 16 and 20 may also be stored in the ROM 120 other than in the disk 150A. The code objects for performing various functions such as an MP3 player function, a navigation function and a video game function may be stored in the disk 150A.

Unpacked RTOS images compression-released by reading the boot image from the ROM 120 during a boot process are loaded to the RAM 130. Code objects required to drive the host OF stored in the disk 150A are loaded to the RAM 130. It will be apparent that a data area for storing data can be allocated to the RAM 130. Circuits required to perform signal processing for reading/writing data can be built in a channel circuit 320. Circuits required to control the head disk assembly 100 for reading/writing data can be built in a servo circuit 330. The RTOS 110A can be a real-time operating system program, which is a multi-program operating system using the disk 310. The RTOS 110A performs real-time multi-processing at a foreground having a high priority, and performs integrated processing at a background having a low priority per task. The RTOS 110A loads code objects from the disk 150A, and unloads code objects to the disk 150A. The RTOS 110A executes a task corresponding to a requested command by managing a code object management unit (COMU) 110-1, a code object loader (COL) 110-2, a memory handler (MH) 110-3, a channel control module (CCM) 110-4, and a servo control module (SCM) 110-5. The RTOS 110A can further manage application programs 220. Specifically, the RTOS 110A can load code objects required to control the disk drive to the RAM 130 during a booting process of the disk drive. Thus, once the booting process is executed, the disk drive can be operated by using the code objects loaded to the RAM 130.

The COMU 110-1 can store information on positions where the code objects have been recorded, and perform processing for arbitrating the bus. The COMU 110-1 can also store information on priorities of tasks being executed. The COMU 110-1 can manage task control block (TCB) information and stack information required to perform tasks corresponding to code objects.

The COL 110-2 can load code objects stored in the disk 150A to the RAM 130 or unload code objects stored in the RAM 130 to the disk 150A using the COMU 110-1. Accordingly, the COL 110-2 can load the code objects stored in the disk 150A to the RAM 130. Here, the code objects can be used to perform methods disclosed in the flowcharts of FIGS. 13 to 16 and 20.

The RTOS 110A can perform methods disclosed in the flowcharts of FIGS. 13 to 16 and 20, which will be described below, using the code objects loaded to the RAM 130. The MH 110-3 can write/read data onto/from the ROM 120 and RAM 130. The CCM 110-4 can perform channel control for performing signal processing for reading/writing data. The SCM 110-5 can perform a servo control including the head disk assembly 100 so as to perform the reading/writing of the data.

Figure 4:
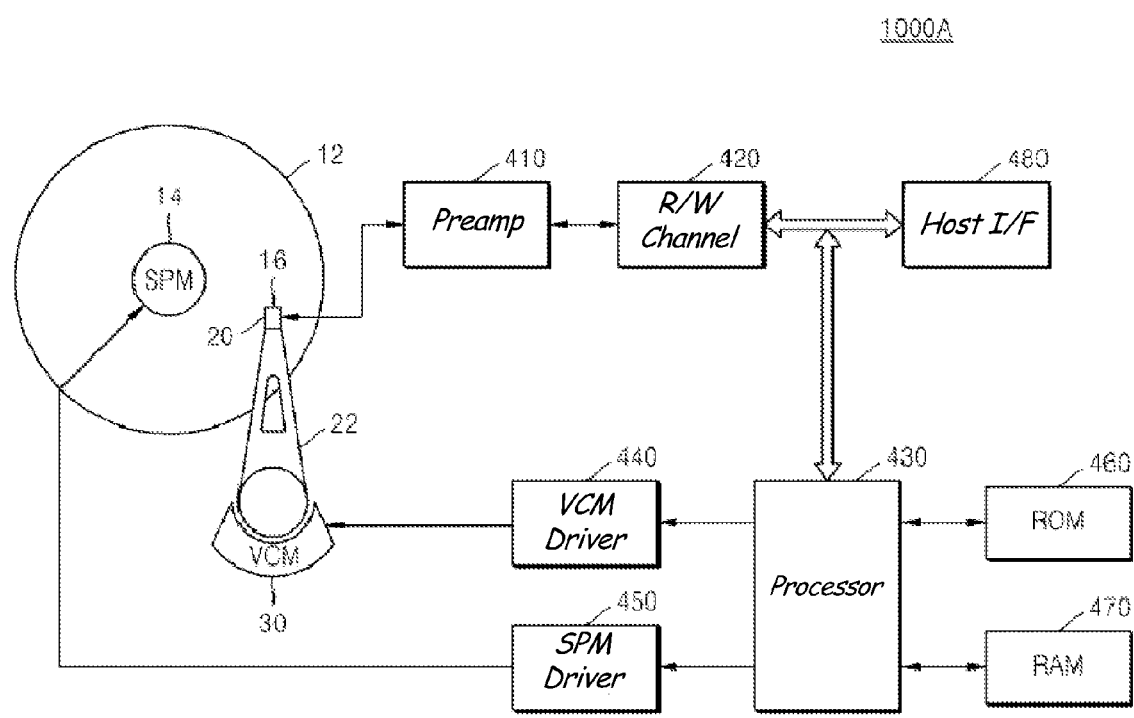
FIG. 4 is a diagram illustrating an electrical configuration of an embodiment of a disk drive.

An embodiment of a storage device according to disclosed embodiments is illustrated in FIG. 4, which shows an electrical circuit configuration of a disk drive 1000A. As shown in FIG. 4, the disk drive 1000A can include a preamplifier 410, a read/write (R/W) channel 420, a processor 430, a voice coil motor (VOM) driving unit 440, an SPM driving unit 450, a ROM 400, a RAM 470 and a host interface 480. The processor 430 can be implemented as a digital signal processor (DSP), a micro processor, a micro-controller, etc. The processor 430 can control the R/W channel 420 to read or write information from/onto the disk 12 in response to a command received from the host device 2000 via the host interface 480. The processor 430 can be coupled to the VCM driving unit 440 for supplying a driving current for driving the VCM 30. The processor 430 can supply a control signal to the VCM driving unit 440 so as to control movement of the head 16. The processor 430 can also be coupled to the SPM driving unit 450 for supplying driving current for driving the SPM 14. When power is supplied, the processor 430 can supply a control signal to the SPM driving unit 450 so as to rotate the SPM 14 at a target speed. The processor 430 can be individually coupled to the ROM 460 and the RAM 470. Firmware and control data for controlling the disk drive can be stored in the ROM 460. The processor 430 can control the disk drive to perform methods disclosed in the flowcharts of FIGS. 13 to 16 and 20, using the program codes and information stored in the ROM 460 or the maintenance cylinder area of the disk 12. Program codes and information for performing methods disclosed in the flowcharts of FIGS. 13 to 16 and 20 may be stored in the ROM 460. It will be apparent that the program codes and information for performing methods disclosed in the flowcharts of FIGS. 13 to 16 and 20 may be stored in the maintenance cylinder area of the disk 12 other than the ROM 460.

In an initial mode, program codes stored in the ROM 460 or the maintenance cylinder area of the disk 12 can be loaded to the RAM 470 under the control of the processor 430, and data received through the host I/F. The RAM 470 may be implemented as a dynamic RAM (DRAM) or static RAM (SRAM). The RAM 470 may be designed to be driven using a single data rate (SDR) or double data rate (DDR) manner.

Data read and write operations performed after searching for a physical address corresponding to a logical block address specified by a read/write command will be described with reference to FIG. 4. In a data read mode, the preamplifier 410 amplifies an electrical signal sensed by the head 16 from the disk 12. Then, the R/W channel amplifies the signal output from the preamplifier 410 using the AGC circuit (not shown) automatically varying a gain according to the amplitude of a signal, converts the amplified signal into a digital signal and then demodulates the digital signal, thereby detecting data. The processor 430 can perform error correction processing on the detected data, for example, using reed Solomon codes that are error correction codes and then convert the data subjected to the error correction processing into stream data. Then, the disk driver 1000A can transmit the stream data to the host device 2000 through the host interface 480. In a data write mode, the disk drive 1000A can receive data input from the host device 2000 through the host interface 480, and the processor 430 can add an error correction symbol according to the reed Solomon codes to the received data. The R/W channel 430 can encode the data having the error correction symbol added thereto so as to be suitable for a recording channel and then record the encoded data onto the disk 12 through the head 16 using recording current amplified by the preamplifier 410.

Figure 5:
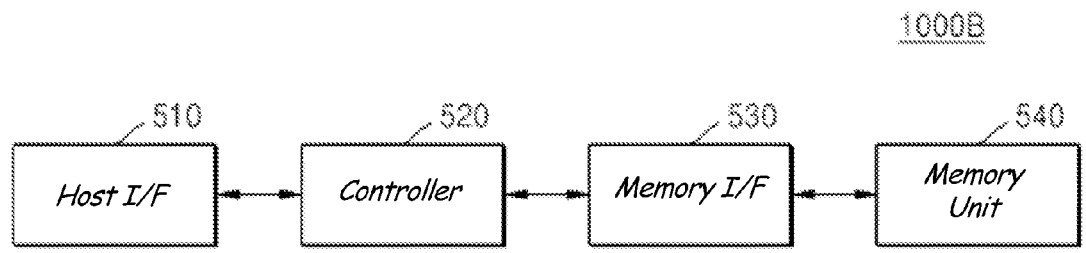
FIG. 5 is a diagram illustrating an embodiment of a solid state drive.

An embodiment of a storage device according to disclosed embodiments is illustrated in FIG. 5, which shows the circuit configuration of an SSD 1000B shown in FIG. 1. The SSD 1000B can be referred to as a solid state drive or solid state disk. As shown in FIG. 5, the SSD 1000B can include a host interface 510, a control unit 520, a memory interface 530 and a memory unit 540. The control unit 520 can control recording, erasing and reading operations of the memory unit 540 in response to a command received from the host device 200 through the host interface 510. The memory interface 530 can communicate data with the memory unit 540 so as to perform the recording, erasing and reading operation under the control of the control unit 520. The memory unit 540 may be configured to include nonvolatile memory devices. For example, the memory unit 540 may be implemented as a phase change RAM (PRAM), ferroelectric RAM (FRAM), magnetic RAM (MRAM), etc. The host interface 510 can perform transmission/reception processing with the host device 2000, which can be a personal computer or mobile device, for example. For example, the host interface 510 may use various types of interfaces such as a serial advance technology attachment (SATA) interface, a parallel advance technology attachment (PATA), or a universal serial bus (USB) interface.

Figure 6:
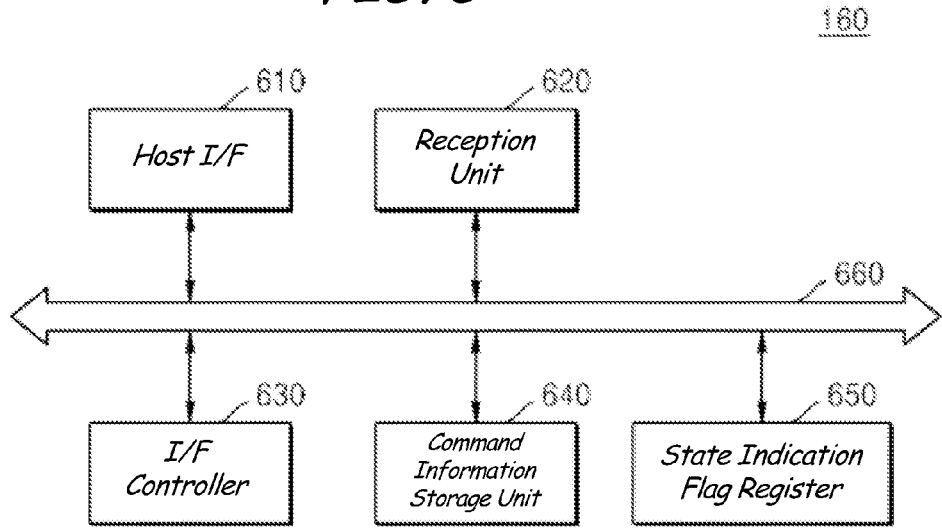
FIG. 6 is a diagram illustrating an embodiment of an interface device.

FIG. 6 shows a detailed configuration of the host interface shown in FIG. 1, 4 or 5. For reference, the host interface shown in FIG. 6 was designated by reference numeral 160 in FIG. 1, reference numeral 480 in FIG. 4 and reference numeral 510 in FIG. 5. However, the host interfaces shown in FIGS. 1, 4 and 5 can be the same component. As shown in FIG. 6, a disclosed host interface can include a transmission unit 610, a reception unit 620, an interface control unit 630, a command information storage unit 640, a state indication flag register 650 and a bus 660. The bus 660 can be a signal line and transmit information between the components of the host interface. The transmission unit 610 can be a circuit means that transmits signals to the host device 2000 through a transmission line, and the reception unit 620 can be a circuit means that receives a signal from the host device 2000 through a reception line. The command information storage unit 640 can store information on a command received from the host device 200 through the reception unit 620 according to a serial communication protocol. The interface control unit 630 generally controls the components constituting the host interface according to the serial communication protocol. That is, the interface control unit 630 controls the transmission unit 610 or the reception unit 620 to transmit or receive signals according to the serial communication protocol. The interface control unit 630 can control the command information storage unit 640 to store information on commands in the signals received through the reception unit 620. The interface control unit 630 can generate information showing that an error recovery process performed by firmware has been finished in a SYNC Escape state, and stores the generated information in the state indication flag register 650.

Here, the SYNC Escape state occurs under a condition for exceptionally switching the state of the storage device to an idle state in a command processing process. For example, the SYNC Escape state may be defined as a state occurring when a synchronization signal is received from the host device in the command processing process. The SYNC Escape state may also be defined as a state occurring when a synchronization signal is received from the host device in an operation state except the idle state according to the serial communication protocol. If the SYNC Escape state occurs, the interface control unit 630 can stop the operation being processed in the storage device. The interface control unit 630 can perform a firmware error recovery process of deleting information on the previous command stored in the command information storage unit 640, and control an interface operation so as not to allow the state of the storage device to be switched to the idle state until the firmware error recovery process is completed.

Specifically, the interface control unit 630 does not control the state of the storage device to be switched to the idle state but controls the state of the storage device to be maintained as the SYNC Escape state even though a synchronization signal SYNC or transmission ready signal X_RDY is received from the host device before the information representing that the firmware error recovery process has been completed in the SYNC Escape state is stored in the state indication flag register 650. That is, if the synchronization signal SYNC or transmission ready signal X_RDY is received from the host device after the information showing that the firmware error recovery process has been completed in the SYNC Escape state is stored in the state indication flag register 650, the interface control unit 630 switches the state of the storage device to the idle state.

In another embodiment, the interface control unit 630 may include a logic circuit for locking the transmission of a reception ready signal R_RDY when the transmission ready signal X_RDY is received in the SYNC Escape state. As such, the logic circuit included in the interface control unit 630 may be designed to be activated in only the SYNC Escape state. For example, the interface control unit 630 may activate the locking of the transmission of the reception ready signal R_RDY when one bit of the state indication flag register 650 is set. The state indication flag register 650 may be designed so that the bit of the state indication flag register 650 is not set in the firmware. The state indication flag register 650 may be designed so that the bit of the state indication flag register 650 is set only when the SYNC Escape state occurs. The state indication flag register 650 may be cleared so as to unlock the locked transmission of the reception ready signal R_RDY. Therefore, when the SYNC Escape state occurs, the bit of the state indication flag register 650 is set, so that although the transmission ready signal X_RDY is received from the host device before the firmware error recovery process is completed, the host interface does not respond to the transmission ready signal X_RDY but maintains the SYNC Escape state. After error recovery such as buffer clear is completed, the firmware can clear the state indication flag register 650. Accordingly, when the state of the storage device is switched to the idle state, and the transmission ready signal X_RDY is received from the host device, the disk drive responds to the reception ready signal R_RDY.

Figure 7:
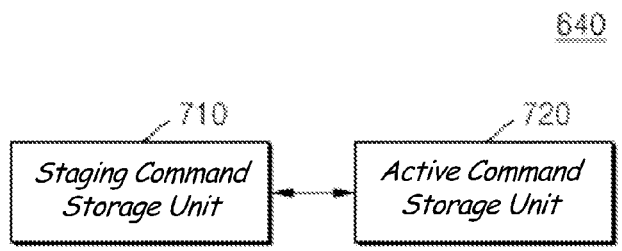
FIG. 7 is a diagram illustrating an embodiment of the command information storage unit shown in FIG. 6.

A detailed configuration of the command information storage unit 640 is illustrated in FIG. 7. As shown in FIG. 7, the command information storage unit 640 can include a staging command storage unit 710 and an active command storage unit 720. The interface control unit 630 can temporarily store information on a command received from the host in the staging command storage unit 710 under the control according the communication protocol. Then, the interface control unit 630 can transmit the information on the command stored in the staging command storage unit 710 to the active command storage unit 720. Then, the interface control unit 630 can transmit a command read from the active command storage unit 720 to a processor or controller of the storage device. The processor or controller of the storage device performs an operation corresponding to the command read from the active command storage unit 720.

Figure 8:
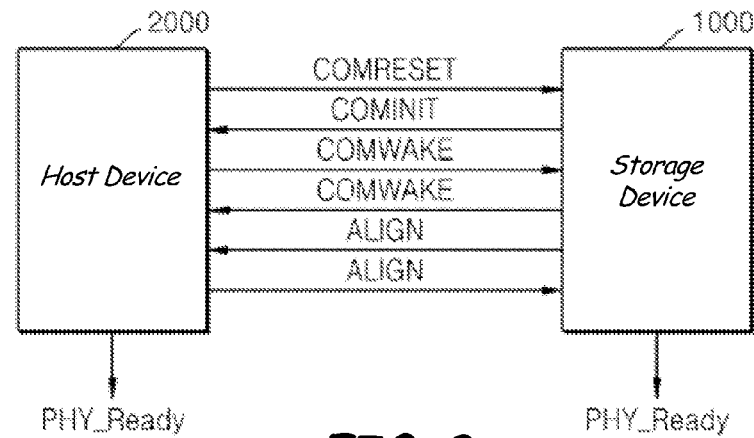
FIG. 8 is a diagram illustrating an embodiment of an initialization process according to a serial advanced technology attachment (SATA).

Next, a power-on sequence according to a SATA communication protocol will be described with reference to FIG. 8. If the host device 2000 is powered on, the host device 2000 Xn generate a COMRESET signal and transmit the generated COMRESET signal to the storage device 1000. After identifying that the COMRESET signal has been received, the storage device 1000 can generate a COMINIT signal corresponding to the COMRESET signal and transmit the generated COMINIT signal to the host device 2000. After identifying that the COMINIT signal has been received, the host device 2000 can generate a COMWAKE signal corresponding to the COMINIT signal and transmit the generated COMWAKE signal to the storage device 1000. After identifying that the COMWAKE signal has been received, the storage device 1000 can generate a COMWAKE signal corresponding to the received COMWAKE signal and transmit the generated COMWAKE signal to the host device 2000. Then, the host device 2000 and the storage device 1000 can communicate an ALIGN signal with each other at a selected data transmission speed, and determine a transmission speed at which the interface between the host device 2000 and the storage device 1000 is possible. After communicating the ALIGN signal with each other, each of the host device 2000 and the storage device 1000 can generate a Phy_Ready signal that is a waiting signal, thereby finishing an initializing process.

Figure 9:
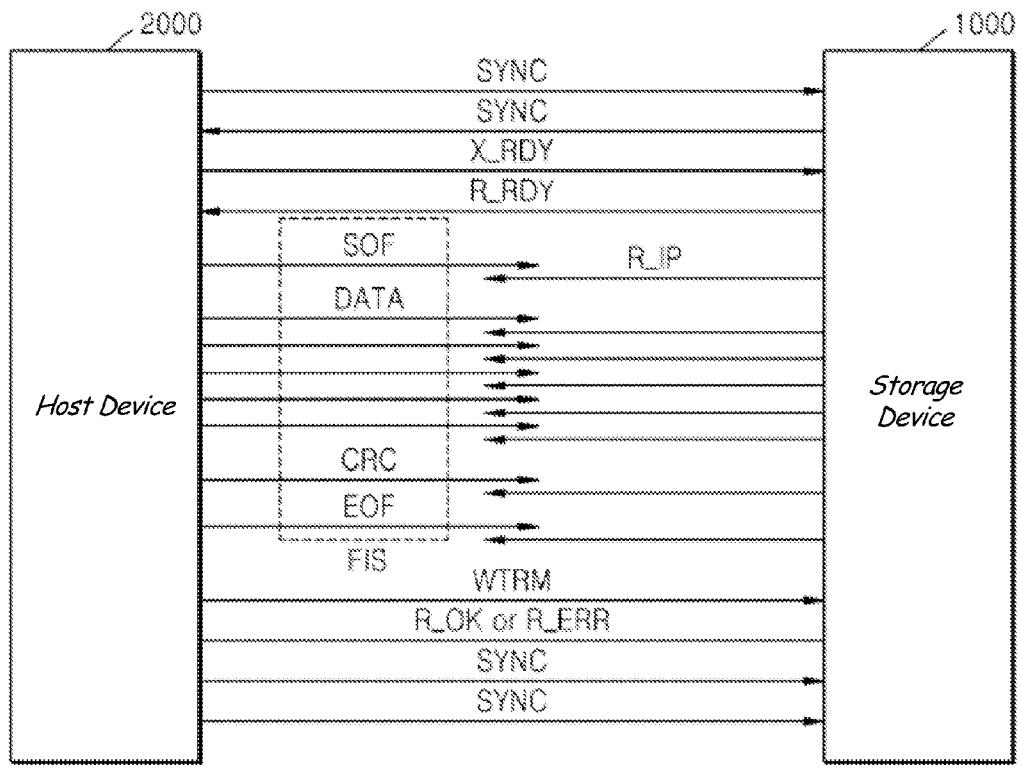
FIG. 9 is a diagram illustrating an embodiment of a data transmission process according to the SATA protocol.

Next, a data transmission operation according to the SATA communication protocol will be described with reference to FIG. 9. First, when there is no data to be transmitted after the initializing process is finished, the host device 2000 and the storage device 1000 communicate only a synchronization signal SYNC with each other. If the data to be transmitted is stored in a buffer (not shown) of the host device 2000, the host device 2000 can generate a transmission ready signal X_RDY representing that it is ready to transmit the data, and transmit the generated transmission ready signal X_RDY to the storage device 1000. After receiving the transmission ready signal X_RDY, the storage device 1000 can generate a reception ready signal R_RDY representing that it is ready to receive the data, and transmit the generated reception ready signal R_RDY to the host device 2000. The process that has been performed so far is called as a handshaking process. If the handshaking process is finished, the host device 2000 and the storage device 1000 can complete the readiness for communication of data. If the handshaking process is finished, the host device 2000 can start transmitting data using a frame information structure (FIS). That is, when transmitting the data, the host device 2000 can inform the storage device 1000 that the file transmission has been started by attaching a start of file (SOF) signal to the foremost portion of the data. When receiving the data, the storage device 1000 transmits, to the host device 2000, an R_IP signal for informing the host device 2000 that the data is being well transmitted. If the transmission of the data is finished, the host device 2000 generates a CRC code for correcting an error of the data when the error of the data occurs and an end of file (EOF) signal for informing the storage device 1000 of the end of file transmission, and transmits the generated CRC code and EOF signal to the storage device 1000. If the storage device 1000 receives each of the CRC code and the EOF signal, the storage device 1000 transmits, to the host device 2000, an RIP signal for informing the host device 2000 that each of the CRC code and the EOF signal is being well transmitted. After transmitting the EOF signal, the host device 2000 generates a WTRM signal for informing the storage device 1000 that the transmission of data has been finished, and transmits the generated WTRM signal to the storage device 1000. The storage device 1000 performs error identification and correction processing on the received data using the CRC code. Then, in a case where no error occurs or the error correction is completed using the CRC code, the storage device 1000 can generate an R_OK signal for informing the host device 2000 that the reception of data has been succeeded, and transmit the generated R_OK signal to the host device 2000. However, in a case where the error correction is impossible using the CRC code, the storage device 1000 can generate an R_ERR signal for informing the host device 2000 that an error has occurred in the reception of the data, and transmit the generated R_ERR signal to the host device 2000. After the host device 2000 receives the R_OK signal, the host device 2000 and the storage device 1000 can communicate a synchronization signal (SYNC) with each other, and the state of each of the host device 2000 and the storage device 1000 is switched to an idle state.

Figure 10:
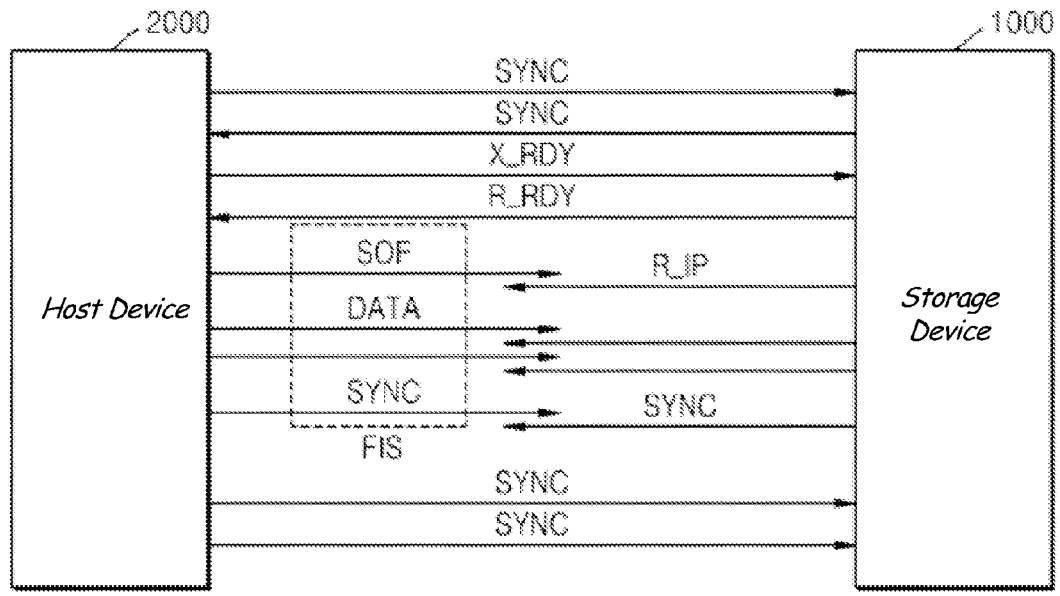
FIG. 10 is a diagram illustrating an embodiment where a SYNC Escape state occurs in the process of processing the data transmission process according to the SATA protocol.

Next, the occurrence of a SYNC Escape state in the data transmission process according to the SATA communication protocol will be described with reference to FIG. 10. If a synchronization signal SYNC is received to the storage device 1000 in the command processing process according to the communication protocol after the handshaking process is completed, the storage device 1000 can stop the operation being processed, and the state storage of the device 1000 can be switched to a SYNC Escape state. Then, the storage device

1000 can transmit the synchronization signal SYNC to the host device 2000. In some embodiments where a synchronization signal SYNC or transmission ready signal X_RDY is received from the host device 2000, the state of the storage device 1000 can be switched to an IDLE state.

Figure 11A:
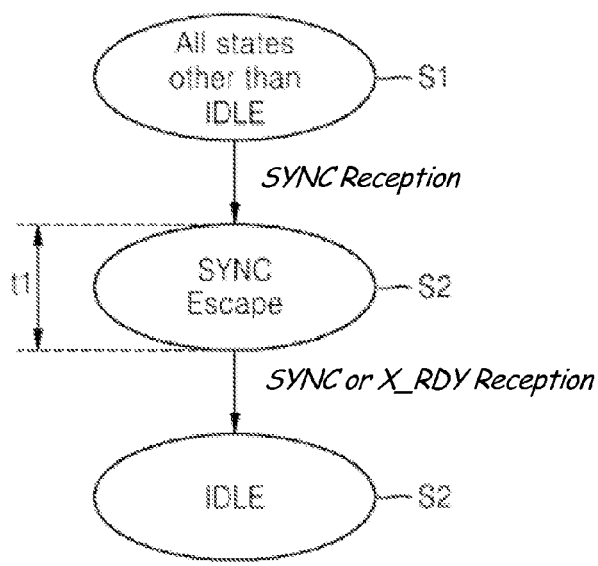
FIG. 11A is a flowchart illustrating an embodiment of a process in which a SYNC Escape state is switched to an idle state in a hardware block of the interface device.

Next, a process in which the state of the storage device is switched from the SYNC Escape state to the IDLE state in a hardware block of the interface is illustrated in FIG. 11A. Referring to FIG. 11A, if a synchronization signal SYNC is received in all states (S1) other than the IDLE state, the storage device stops the operation being processed, and the state of the storage device is switched to the SYNC Escape state (S2). Then, if a synchronization signal SYNC or transmission ready signal X_RDY is received in the SYNC Escape state (S2), the state of the storage device is switched to the IDLE state (S3).

Figure 11B:
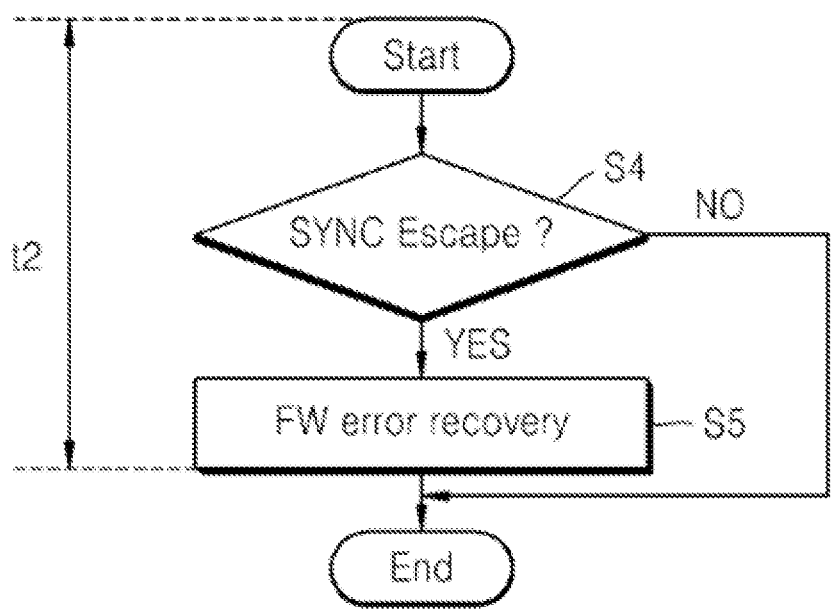
FIG. 11B is a flowchart illustrating an embodiment of a process in which an interface operation according to the occurrence of the SYNC Escape state of the interface device is controlled in firmware.

Next, a process in which the firmware controls an interface operation according to the SYNC Escape state of the interface device is shown in FIG. 11B. First, the firmware determines whether or not the SYNC Escape state occurs (S4). The SYNC Escape state may occur when the synchronization signal SYNC is received in all states other than the IDLE state. If the SYNC Escape state occurs, a firmware (FW) error recovery operation is performed (S5). The firmware recovery operation can be include deleting information on the previous command stored in the hardware block. Referring to FIG. 6, the FW error recovery operation of deleting information on the previous command stored in the command information storage unit 640 can be performed by the firmware of the interface control unit 630. Specifically, the information on the previous command stored in the staging command storage unit 710 or active command storage unit 720 of FIG. 7 can be deleted in the FW error recovery operation.

Referring to FIGS. 11A and 11B, the time taken until the state of the storage device is switched to the IDLE state from the time point when the SYNC Escape state (S2) occurs in the hardware block of the interface device is t1, and the time taken until the FW error recovery operation is completed by the firmware of the interface device in the SYNC Escape state is t2. The time t2 is generally longer than the time t1. If the time t2 is longer than the time t1, the state of the storage device is switched to the IDLE state in the hardware block of the interface device before the FW error recovery operation is completed. Then, the previous command and the newly received command collide with each other, and therefore, a malfunction may occur.

Figure 12A:
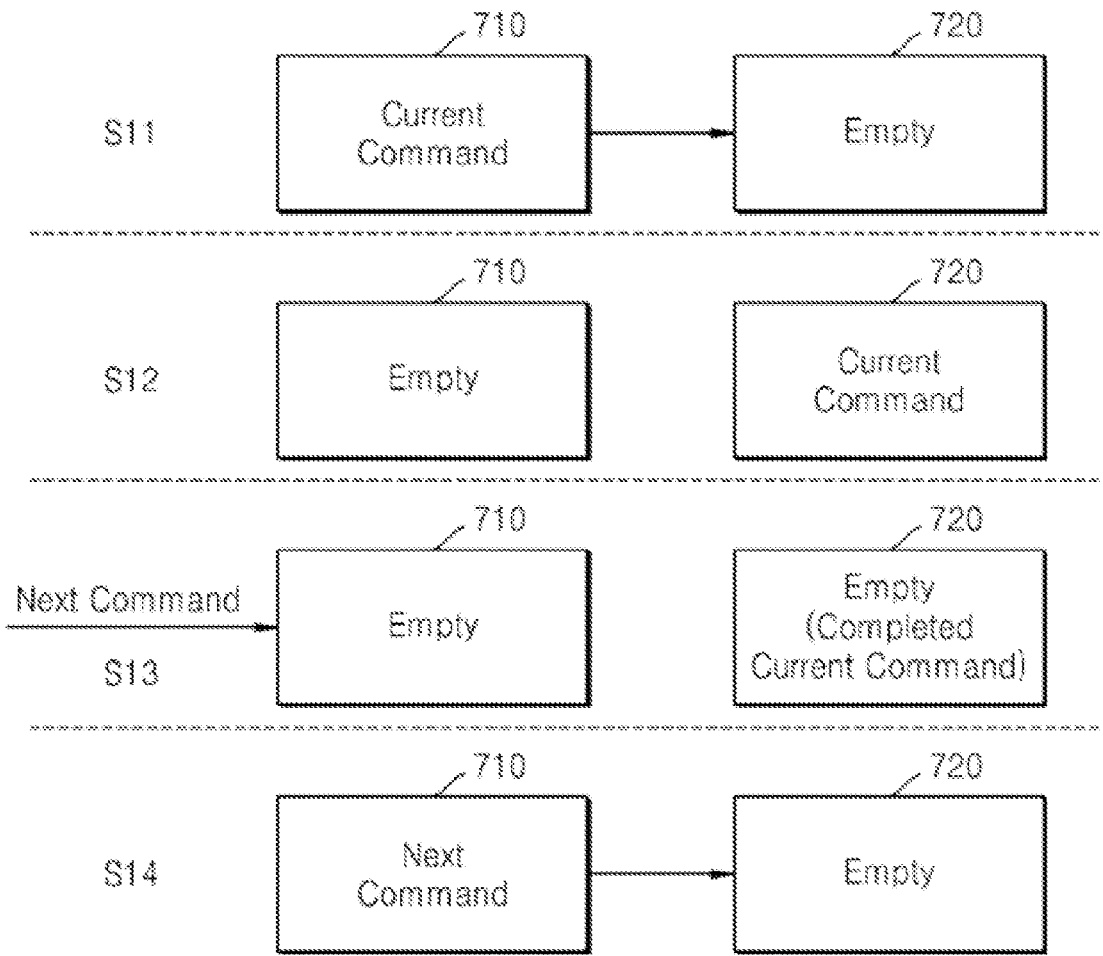
FIG. 12A is a conceptual diagram illustrating an embodiment of a state in which command information is moved according to a normal process in a command information storage unit of an interface device.

The storage state of command information in the staging command storage unit 710 and the active command storage unit 720 in a normal process will be described with reference to FIG. 12A. If a command is received from the host device in the IDLE state according to the communication protocol, command information on the received current command is stored in the staging command storage unit 710 (S11). The active command storage unit 720 is in an empty state in the IDLE state. Then, the current command stored in the staging command storage unit 710 can be transmitted to the active command storage unit 720 (S12). Accordingly, the staging command storage unit 710 is in an empty state. Then, if an operation according to the current command stored in the active command storage unit 720 is performed, the command information stored in the active command storage unit 720 can be deleted. After the operation according to the current command is finished, the state of the storage device is in the IDLE state. Then, when a next command is received from the host device, the staging command storage unit 710 and the active command storage unit 720 are in an empty state (S13). The next command received from the host device can be stored in the staging command storage unit 710 (S14).

Figure 12B:
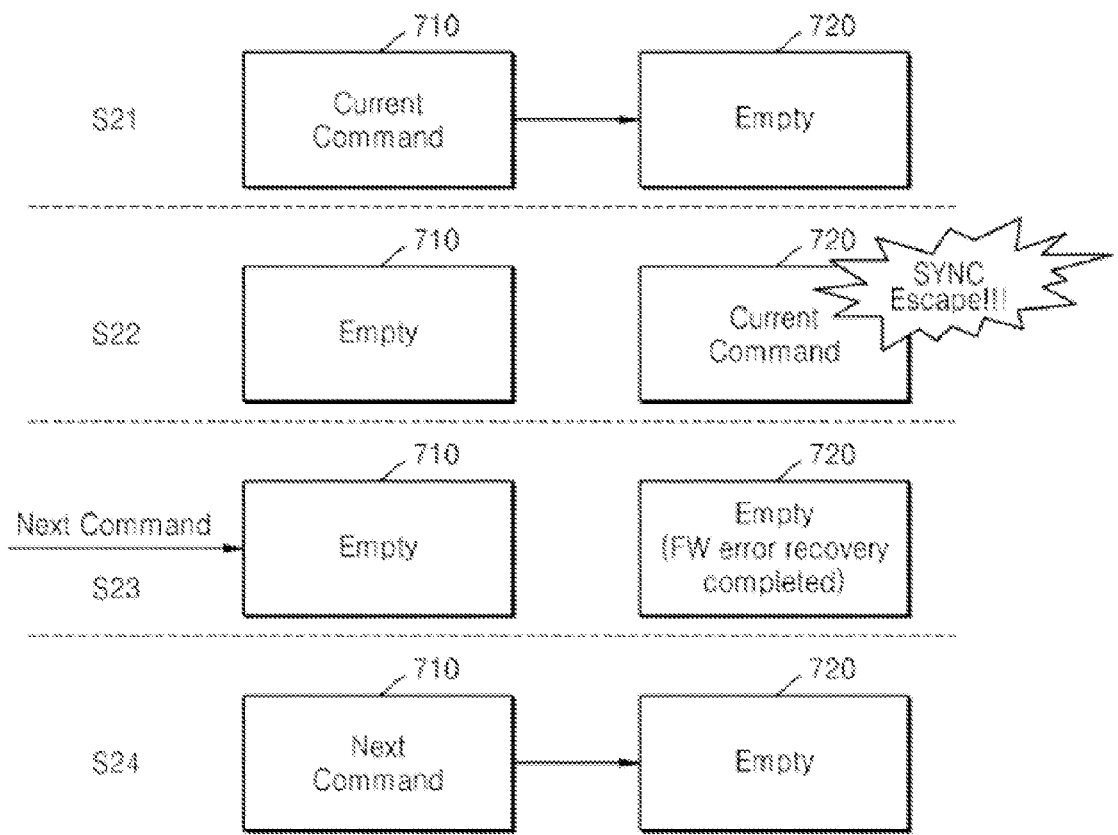
FIG. 12B is a conceptual diagram illustrating an embodiment of a state in which the command information in the command information storage unit of the interface device is normally moved when a SYNC Escape state occurs.

Next, the storage state of command information in the staging command storage unit 710 and the active command storage unit 720 when the SYNC Escape state occurs will be described with reference to FIG. 12B. If a command is received from the host device in the IDLE state according to the communication protocol, command information on the received current command is stored in the staging command storage unit 710 (S21). The active command storage unit 720 is in an empty state in the IDLE state. Then, the command information stored in the staging command storage unit 710 is transmitted to the active command storage unit 720 (S22). Accordingly, the staging command storage unit 710 is in an empty state. If a synchronization signal SYNC is received from the host device in the process of processing the command transmitted to the active command storage unit 720 and stored in the active command storage unit 720, a SYNC Escape state occurs. If the SYNC Escape state occurs, the FW error recovery operation of deleting the command information stored in the active command storage unit 720 is performed. Then, the state of the storage device is switched to the IDLE state from the SYNC Escape state, and a next command is received from the host device. In this case, if the FW error recovery operation is completed, the staging command storage unit 710 and the active command storage unit 720 are in an empty state (S23). The next command received from the host device is stored in the staging command storage unit 710 (S24).

Figure 12C:
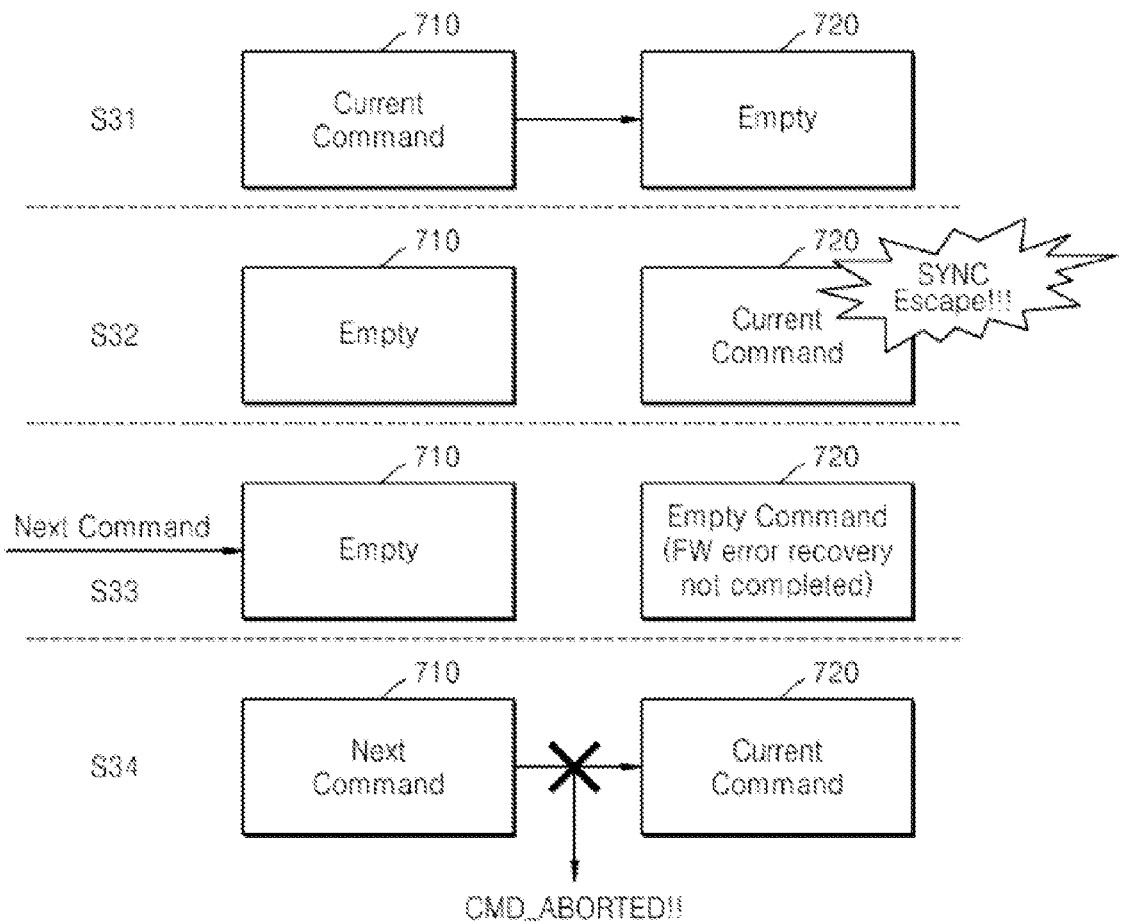
FIG. 12C is a conceptual diagram illustrating an embodiment of an example in which the command information in the command information storage unit of the interface device is collided when the SYNC Escape state occurs.

Next, the storage state of command information in the staging command storage unit 710 and the active command storage unit 720 when the SYNC Escape state occurs will be described with reference to FIG. 12C. If a command is received from the host device in the IDLE state according to the communication protocol, command information on the received current command is stored in the staging command storage unit 710 (S31). The active command storage unit 720 is in an empty state in the IDLE state. Then, the command information stored in the staging command storage unit 710 can be transmitted to the active command storage unit 720 (S32). Accordingly, the staging command storage unit 710 is in an empty state. If a synchronization signal SYNC is received from the host device in the process of processing the command transmitted to the active command storage unit 720 and stored in the active command storage unit 720, a SYNC Escape state occurs. If the SYNC Escape state occurs, the FW error recovery operation of deleting the command information stored in the active command storage unit 720 is performed. Then, the state of the storage device can be switched to the IDLE state from the SYNC Escape state, and a next command is received from the host device. In this case, if the FW error recovery operation is not completed, the active command storage unit 720 is maintained in a state that is not completely empty (S33). The next command received from the host device in the IDLE state is stored in the staging command storage unit 710 (S34). Thus, the next command is stored in the staging command storage unit 710, and the current command is stored in the active command storage unit 720. Accordingly, the collision between the commands occurs, and therefore, a malfunction may occur.

Figure 13:
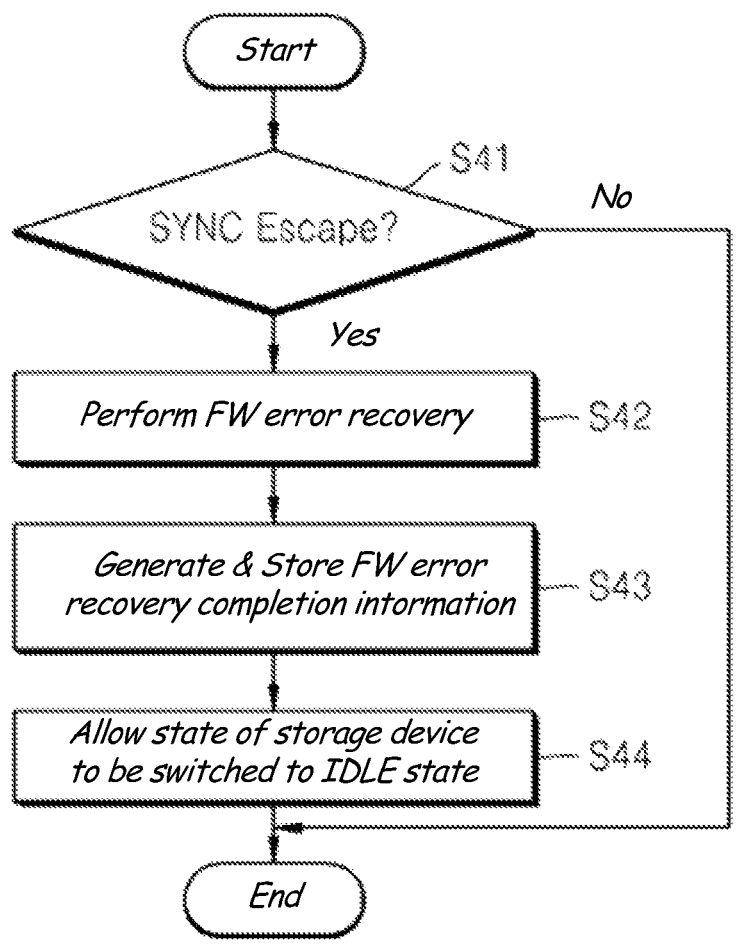
FIG. 13 is a flowchart illustrating an embodiment of a method of controlling an interface operation.

A method for controlling an interface operation so as to prevent the state of the storage device from being switched to the IDLE state before the FW error recovery operation is completed in the SYNC Escape state is disclosed herein. A method of controlling an interface operation, performed by the interface control unit 630 of FIG. 6, will be described in detail with reference to FIG. 13. In FIG. 13, the interface control unit 630 can decide whether or not a SYNC Escape state occurs in the storage device (S41). An embodiment of a process of deciding whether or not the SYNC Escape state occurs is illustrated in FIGS. 14 and 15.

Figure 14:
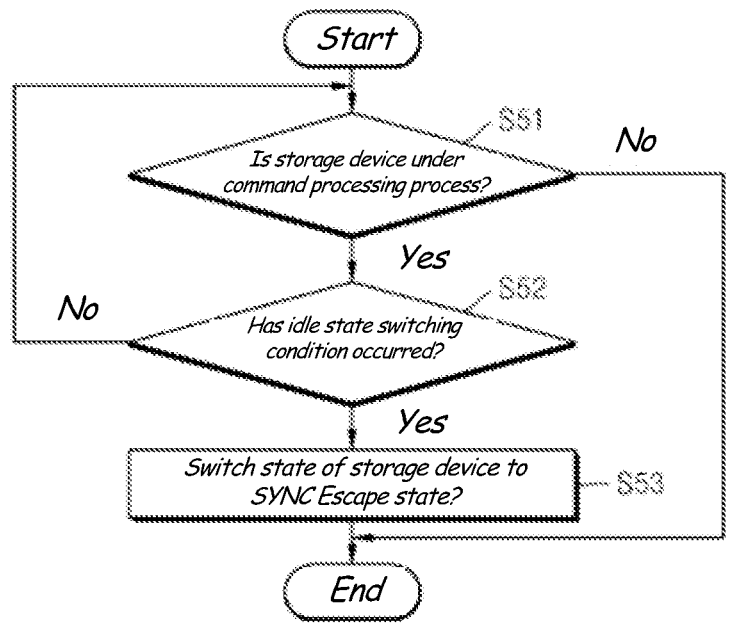
FIG. 14 is a flowchart illustrating an embodiment of a process of deciding whether to switch to the SYNC Escape state illustrated in FIG. 13.
Figure 15:
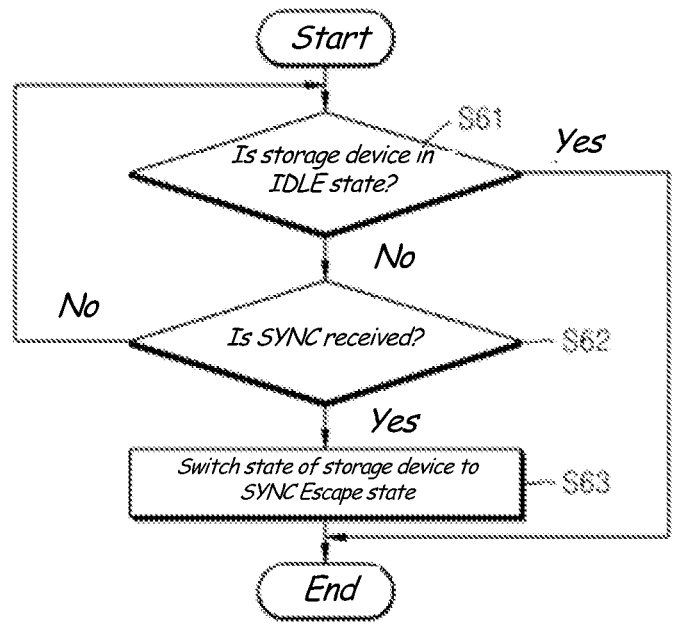
FIG. 15 is a flowchart illustrating an embodiment of a process of deciding whether to switch to the SYNC Escape state illustrated in FIG. 13.

With reference to FIG. 14, the interface control unit 630 decides whether or not the storage device is under a command processing process according to the communication protocol (S51). That is, the interface control unit 630 decides whether the storage device is in a state in which the storage device receives data transmitted from the host device or processes a command transmitted from the host device according to the serial communication protocol. In a case where it is decided at the step S51 that the storage device is under the command processing process, the interface control unit 630 decides whether or not an idle state switching condition occurs in the command processing process (S52). Here, a condition in which a synchronization signal SYNC is received from the host device in the command processing process may be included in the idle state switching condition. In a case where it is decided at the step S52 that the idle state switching condition has occurred, the interface control unit 630 stops the operation processed in the storage device and allows the state of the storage device to be switched to the SYNC Escape state (S53).

Another embodiment of a process of deciding whether or not the SYNC Escape state occurs is described with reference to FIG. 15. The interface control unit 630 decides whether or not the storage device is in an IDLE state (S61). The IDLE state means a state of waiting to receive a next command after the execution of the received current command is finished. In a case where it is decided at the step S61 that the storage device is not in the IDLE state, the interface control unit 630 decides whether or not a synchronization signal SYNC is received from the host device (S62). That is, the interface control unit 630 decides whether or not the synchronization signal SYNC is received in all states other than the IDLE state. In a case where it is decided at the step S62 that the synchronization signal SYNC is received in all states other than the IDLE state, the interface control unit 630 stops the operation processed in the storage device and allows the state of the storage device to be switched to a SYNC Escape state (S63). In such a manner, it is possible to decide whether or not the SYNC Escape state occurs.

Referring back to FIG. 13, in a case where it is decided at the step S41 that the SYNC Escape state has occurred, the interface control unit 630 performs a FW error recovery operation (S42). The FW error recovery operation refers to an operation of deleting information on the previous command stored in the storage device. That is, the interface control unit 630 performs an operation of deleting information on the previous command stored in the command information storage unit 640 of FIG. 6. Specifically, the interface control unit 630 performs an operation of deleting the command information stored in the staging command storage unit 710 or the active command storage unit 720. After performing the FW error recovery operation, the interface control unit 630 generates FW error recovery completion information and stores the generated FW error recovery completion information in the state indication flag register 650 (S43). After generating the FW error recovery completion information, the interface control unit 630 controls the storage device so as to allow the state of the storage device to be switched to the IDLE state (S44).

Figure 16:
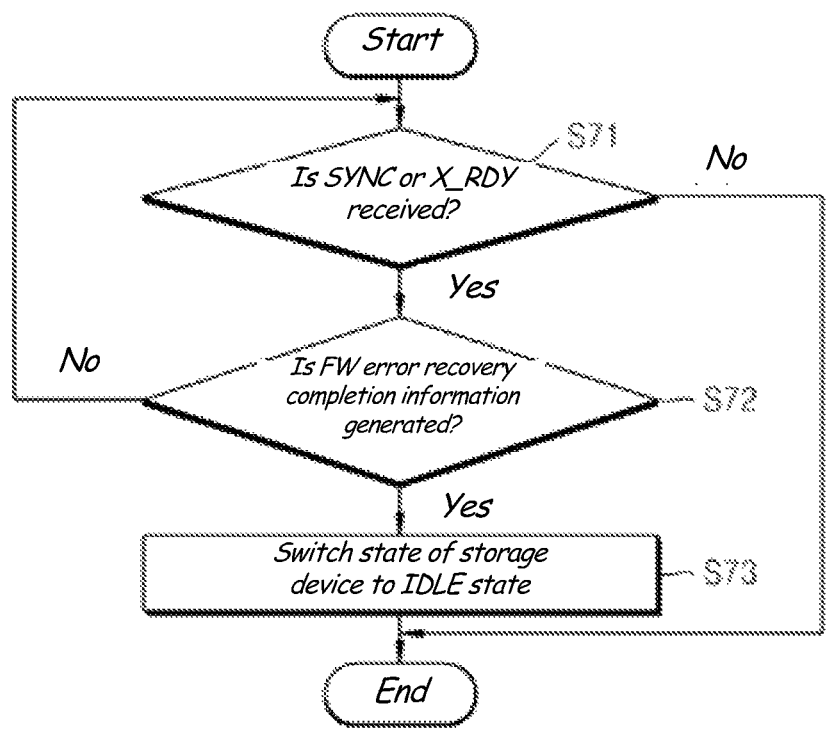
FIG. 16 is a flowchart illustrating an embodiment of a process of allowing the switch to the SYNC Escape state illustrated in FIG. 13.

An embodiment of an operation in which the state of the storage device is switched to the IDLE state will be described with reference to FIG. 16. Referring to FIG. 16, the interface control unit 630 decides whether or not a synchronization signal SYNC or transmission ready signal X_RDY is received from the host device in the SYNC Escape state (S71). In a case where it is decided at the step S71 that the synchronization signal SYNC or transmission ready signal X_RDY has been received from the host device in the SYNC Escape state, the interface control unit 630 decides whether or not FW error recovery completion information occurs (S72). That is, the interface control unit 630 may decide whether or not the FW error recovery completion information occurs using the state indication flag register 650. For example, the FW error recovery completion information may be represented by 1 bit. In this case, the interface control unit 630 may decide whether or not the FW error recovery completion information is stored as a logic state of the state indication flag register 650. In a case where it is decided at the step S72 that the FW error recovery completion information has occurred, the interface control unit 630 allows the state of the storage device to the IDLE state (S73).

Referring to the flowchart of FIG. 16, in a case where the synchronization signal SYNC or transmission ready signal X_RDY is received from the host device in the state in which the FW error recovery completion information does not occur, the interface control unit 630 performs the step S71. That is, in a case where the synchronization signal SYNC or transmission ready signal X_RDY is received from the host device in the state in which the FW error recovery completion information does not occur, the state of the storage device is not switched to the IDLE state but maintains the SYNC Escape state as it is.

A Table for specifying operations in the SYNC Escape state according to the flowcharts shown in FIGS. 11A and 11B is shown in FIG. 17. Referring to FIG. 17, if the link layer receives a SYNC primitive (SYNCp) that is a synchronization signal from the host device in a process of executing a command according to the communication protocol, the sate of the storage device is switched to a SYNC Escape state (L_SyncEscape). Although another signal except an X_RDY primitive (X_RDYp) or synchronization primitive (SYNCp) is received from the physical layer, the state of the storage device is maintained as the SYNC Escape state (L_SyncEscape). Then, if the X_RDY primitive (X_RDYp) or synchronization primitive (SYNCp) is received from the physical layer, the state of the storage device is maintained as an IDLE state (L_IDLE). Then, if it is detected in the host link layer that the physical layer is not ready, the state of the storage device is switched to an L_NoCommErr state that is a state in which the transmission of data is impossible.

A table for specifying operations in the SYNC Escape state according to the flowcharts shown in FIGS. 13 to 16 is shown in FIG. 18. Referring to FIG. 18, if the link layer receives a SYNC primitive (SYNCp) that is a synchronization signal from the host device in a process of executing a command according to the communication protocol, the sate of the storage device is switched to a SYNC Escape state (L_SyncEscape). Although another signal except an X_RDY primitive (X_RDYp) or synchronization primitive (SYNCp) is received from the physical layer, the state of the storage device is maintained as the SYNC Escape state (L_SyncEscape). Then, if the X_RDY primitive (X_RDYp) or synchronization primitive (SYNCp) is received from the physical layer in the state in which the FW error recovery operation is not completed, the state of the storage device is maintained as the SYNC Escape state (L_SyncEscape). That is, the state of the storage device is not switched to the IDLE state (L_IDLE) but maintained as the SYNC Escape state (L_SyncEscape) as it is. Then, if the X_RDY primitive (X_RDYp) or synchronization primitive (SYNCp) is received from the physical layer in the state in which the FW error recovery operation is completed, the state of the storage device is switched to the IDLE state (L_IDLE). Then, if it is detected in the host link layer that the physical layer is not ready, the state of the storage device is switched to an L_NoCommErr state that is a state in which the transmission of data is impossible. Thus, if the X_RDY primitive (X_RDYp) or synchronization primitive (SYNCp) is received from the physical layer before the FW error recovery operation is completed in the SYNC Escape state in the table of FIG. 17, the state of the storage device is switched to the IDLE state.

Even though the X_RDY primitive (X_RDYp) or synchronization primitive (SYNCp) is received from the physical layer before the FW error recovery operation is completed in the SYNC Escape state in the table of FIG. 18, the state of the storage device is not switched to the IDLE state but maintained as the SYNC Escape state. That is, the state of the storage device is switched to the IDLE state only when the X_RDY primitive (X_RDYp) or synchronization primitive (SYNCp) is received after the FW error recovery operation is completed in the SYNC Escape state.

The methods illustrated in the flowcharts shown in FIGS. 13 to 16, can make it possible to prevent a malfunction caused by a difference in response speed between the hardware and firmware when an exceptional situation such as the SYNC Escape occurs in the command processing process according to the communication protocol.

Figure 19:
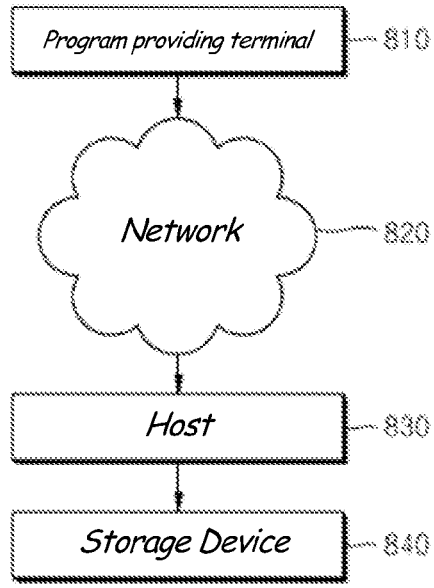
FIG. 19 is a network configuration diagram illustrating an embodiment of a method of controlling an interface operation by downloading a program through a network.

Next, an embodiment of a method of controlling an interface operation by downloading a program through a network will be described. First, a network system performing the method of controlling an interface operation by downloading a program through a network will be described with reference to FIG. 19. As shown in FIG. 19, the illustrated network system can include a program providing terminal 810, a network 820, a host PC 830 and a storage device 840. The network 820 may be implemented as a communication network such as the Internet. The network 820 may be implemented as a wired communication network or a wireless communication network. Embodiments of a program for controlling an interface operation, which are illustrated in FIGS. 13 to 16 can be stored in the program providing terminal 810. The program providing terminal 810 performs a process of transmitting the program for controlling the interface operation to the host PC 830 in response to a program transmission request of the host PC 830 accessing the program providing terminal 810 through the network 820. The host PC 830 is provided with hardware and software that can perform an operation of requesting the program providing terminal 810 to transmit the program for controlling the interface operation after the host PC 830 accesses the program providing terminal 810 through the network 820, and downloading the requested program for controlling the interface operation from the program providing terminal 810. The host PC 830 enables the storage device 840 to perform the method for controlling the interface operation through the program downloaded from the program providing terminal 810, based on the flowcharts shown in FIGS. 13 to 16.

Figure 20:
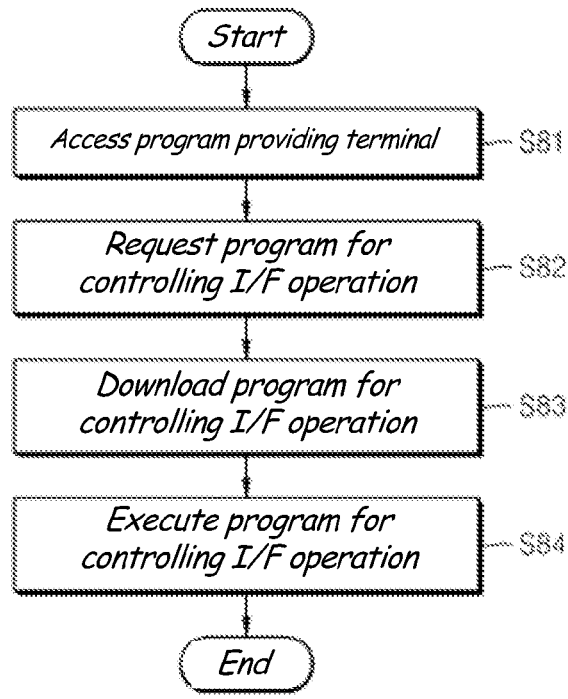
FIG. 20 is a flowchart illustrating an embodiment of a method of controlling an interface operation by downloading a program through a network.

FIG. 20 illustrates an embodiment of a method of controlling an interface operation by downloading a program through a network. First, the host PC 830, using a storage device such as a disk drive or SSD, can access the program providing terminal 810 through the network 820 (S81). After the host PC 830 accesses the program providing terminal 810, the host PC 830 can transmit, to the program providing terminal 810, information for requesting the program providing terminal 810 to transmit the program for controlling the interface operation (S82). Then, the program providing terminal 810 can transmit the requested program for controlling the interface operation to the host PC 830, so that the host PC 830 downloads the program for controlling the interface operation (S83). Then, the host PC 830 can allow the download of the program for controlling the interface operation to be executed in the storage device 840 (S84). The program for controlling the interface operation is executed in the storage device, so that methods for controlling the interface operation according to the flowcharts shown in FIGS. 13 to 16 can be performed in the storage device.

Disclosed herein are methods, apparatuses, and systems for example. When disclosed methods are executed as software, the steps of the method can be code segments performing required processes. Programs or code segments can be stored in a processor-readable medium. Examples of processor readable medium can include, for exmaple electronic circuits, semiconductor memory elements, a ROM, a flash memory, an erasable ROM (EROM), floppy disks, optical disks, and hard disks for example.

In some embodiments, methods can include: stopping an operation being processed in a storage device and switching the state of storage device to a first state, when a condition for switching the state of the storage device to an idle state occurs in a command processing process according to a communication protocol; performing an operation of deleting information on a previous command stored in hardware of the storage device when the state of the storage device is switched to the first state; and switching the state of the storage device to the idle state after the operation of deleting the information on the previous command is completed, wherein in the first state, the switching of the state of the storage device to the idle state is not allowed before the operation of deleting the information on the previous command is completed. In some embodiments, the condition for switching the state of the storage device to the idle state may include a condition in which a synchronization signal is received from a host device in the command processing process. In some embodiments, the switching of the state of the storage device to the first state may include stopping the operation being processed in the storage device and switching the state of the storage device to the first state when a synchronization signal is received from the host device in all states other than the idle state according to a serial communication protocol. In some embodiments, the switching of the state of the storage device to the idle state may include generating information representing a second state when the operation of deleting the information on the previous command is completed, and switching the state of the storage device to the idle state after the information representing the second state is generated. In some embodiments, when the information representing the second state is generated and a synchronization signal or transmission ready signal is then received from the host device, the state of the storage device may be switched to the idle state. In some embodiments, although the synchronization signal or transmission ready signal is received when the information representing the second state is not generated, the state of the storage device is maintained as the first state.

Also disclosed herein are interface devices that can include: a transmission unit configured to transmit a signal through a transmission signal line; a reception unit configured to receives a signal through a reception signal line; a storage means configured to store information on a command received through the reception unit; and an interface control unit configured to transmit or receive a signal through the transmission unit or the reception unit according to a serial communication protocol, and process the command based on the information stored in the storage means, wherein when a condition for switching the state of a storage device to an idle state occurs in the command processing process, the interface control unit allows the state of the storage device not to be switched to the idle state until a process of deleting information on a previous command stored in the storage means is completed. In some embodiments, the interface control unit may perform a process of stopping an operation being processed in the storage device and switching the state of the storage device to a first state when a synchronization signal is received from a host device in all states other than the idle state, perform a processing of deleting the information on the previous command stored in the storage means when the state of the storage device is switched to the first state, and perform a process of switching the state of the storage device to the idle state after the process of deleting the information on the previous command is completed. In some embodiments, the interface control unit may generate information representing a second state when the process of deleting the information on the previous command is completed, and then switch the state of the storage device to the idle state after the information representing the second state is generated. In some embodiments, the interface device may further include a state indication flag register configured to store the information representing the second state. In some embodiments, the interface control unit may switch the state of the storage device to the idle state when a synchronization signal or transmission ready signal is received from the host device in the state in which the information representing the second state is stored in the state indication flag register.

Thus, embodiments of METHODS FOR CONTROLLING INTERFACE OPERATION AND INTERFACE DEVICE APPLYING THE SAME are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method for controlling an interface operation, the method comprising:
    stopping an operation being processed in a storage device and switching the state of the storage device to a first state when a condition for switching the state of the storage device to an idle state occurs in a command processing process according to a communication protocol;
    deleting unprocessed command information stored in hardware of the storage device when the state of the storage device is switched to the first state; and
    switching the state of the storage device to the idle state after the deletion of the unprocessed command information is completed,
    wherein, when in the first state, the state of the storage device cannot be switched to the idle state before the deletion of the unprocessed command information is completed.

2. The method of claim 1, wherein the condition for switching the state of the storage device to the idle state includes a condition in which a synchronization signal is received from a host device in the command processing process.

3. The method of claim 1, wherein the condition for switching the state of the storage device to the idle state includes a condition in which a synchronization signal is received from a host device in all states other than the idle state according to a serial communication protocol.

4. The method of claim 1, wherein switching the state of the storage device to the idle state comprises:
    generating information representing a second state when the deletion of the unprocessed command information is completed; and
    switching the state of the storage device to the idle state after the information representing the second state is generated.

5. The method of claim 4, wherein when the information representing the second state is generated and a synchronization signal or transmission ready signal is then received from a host device, the state of the storage device is switched to the idle state.

6. The method of claim 4, wherein the state of the storage device is maintained as the first state in response to the synchronization signal or transmission ready signal being received when the information representing the second state is not generated.

7. A storage device, comprising:
    a transmission unit configured to transmit a signal through a transmission signal line;
    a reception unit configured to receive a signal through a reception signal line;
    a storage means configured to store information regarding a command received through the reception unit; and
    an interface control unit configured to transmit or receive a signal through the transmission unit or the reception unit according to a serial communication protocol and to process the command based on the information stored in the storage means,
    wherein, when a condition for switching the state of the storage device to an idle state occurs in a command processing process, the interface control unit does not allow the state of the storage device to be switched to the idle state until unprocessed command information stored in the storage means is deleted.

8. The storage device of claim 7, wherein the interface control unit performs a process of stopping an operation being processed in the storage device and switching the state of the storage device to a first state when a synchronization signal is received from a host device in all states other than the idle state, performs deleting the unprocessed command information stored in the storage means when the state of the storage device is switched to the first state, and performs a process of switching the state of the storage device to the idle state after the unprocessed command information is deleted.

9. The storage device of claim 7, wherein the interface control unit generates information representing a second state when the unprocessed command information is deleted and switches the state of the storage device to the idle state after the information representing the second state is generated.

10. The storage device of claim 9, further comprising a state indication flag register configured to store the information representing the second state,
    wherein the interface control unit switches the state of the storage device to the idle state when a synchronization signal or transmission ready signal is received from a host device and the information representing the second state is stored in the state indication flag register.

11. A method for controlling an interface between a host and a storage device, the method comprising:
    receiving a condition for switching the state of the storage device to an idle state; and
    performing an escape process if the storage device is not in the idle state after receiving a condition for switching the state of the storage device to the idle state, wherein the escape process comprises:

stopping operations being processed in the storage device, deleting unprocessed commands stored in the storage device, and switching the storage device to the idle state after the deletion of the unprocessed commands stored in the storage device is completed.

12. The method of claim 11, wherein the condition for switching the state of the storage device to the idle state comprises a synchronization signal received from the host.

13. The method of claim 12, wherein the method further comprises transmitting a synchronization signal to the host after receiving the synchronization signal from the host and after performing the escape process.

14. The method of claim 11, wherein stopping operations being processed in the storage device and deleting unprocessed commands stored in the storage device occur simultaneously.

15. The method of claim 11, wherein deleting unprocessed commands stored in the storage device comprises:

deleting commands stored in an active command storage unit configured to store commands from the host prior to performing the commands; and deleting commands stored in a staged command storage unit configured to store commands from the host prior to the commands being transmitted to the active command storage unit.

16. An interface device for use in a storage device operably coupled to a host, the interface device comprising:

a storage unit configured to store commands received from the host; and an interface control unit operably coupled to the storage unit and configured to transmit and receive signals to and from the host, wherein the interface control unit is configured to:

process one or more of the commands stored in the storage unit, and perform an escape process if the storage device is not in an idle state after receiving a condition for switching the storage device to an idle state, wherein the escape process comprises switching the storage device to the idle state after deleting the unprocessed commands stored in the storage unit.

17. The interface device of claim 16, wherein the interface device further comprises a state indication flag register configured to store the state of the storage device.

18. The interface device of claim 16, wherein the condition for switching the state of the storage device to an idle state comprises a synchronization signal received from the host, wherein the interface control unit is further configured to transmit a synchronization signal to the host after receiving the synchronization signal from the host and after performing the escape process.

19. The interface device of claim 16, wherein the escape process comprises stopping operations being processed in the storage device.

20. The interface device of claim 16, wherein the storage unit further comprises:

an active command storage unit configured to store commands from the host prior to performing the commands; and a staging command storage unit operably coupled to the active command storage unit and configured to store commands from the host prior to the commands being transmitted to the active command storage unit, wherein, when deleting the unprocessed commands stored in the storage unit, the interface control unit is further configured to:

delete commands stored in the staging command storage unit; and delete commands stored in the active command storage unit.

* * * * *